United States Patent [19]

Danese

[11] Patent Number: 4,948,655
[45] Date of Patent: Aug. 14, 1990

[54] COMPOSITE PANEL AND METHOD OF MANUFACTURING WATERPROOF ROOFINGS

[75] Inventor: Marco Danese, Verona, Italy

[73] Assignee: Nord Bitumi S.a.s. di Marco Danese & C., Sona, Italy

[21] Appl. No.: 135,125

[22] Filed: Dec. 18, 1987

[30] Foreign Application Priority Data

Dec. 24, 1986 [IT] Italy .................. 84966 A/86

[51] Int. Cl.⁵ .......................... B32B 7/02; B32B 9/00; B32B 11/00
[52] U.S. Cl. .................................. 428/213; 428/215; 428/318.4; 428/319.7; 428/489
[58] Field of Search .................. 428/489, 318.4, 314.4, 428/314.8, 213, 215, 319.7

[56] References Cited

U.S. PATENT DOCUMENTS

| | | | |
|---|---|---|---|
| 3,802,950 | 4/1974 | Stevens | 428/318.4 |
| 4,039,706 | 8/1977 | Tajima et al. | 428/489 |
| 4,045,265 | 8/1977 | Tajima et al. | 428/489 |
| 4,357,377 | 11/1982 | Yamamoto | 428/318.4 |
| 4,372,997 | 2/1983 | Fritze et al. | 428/144 |
| 4,521,478 | 6/1985 | Hageman | 428/489 |
| 4,599,258 | 7/1986 | Hageman | 428/489 |
| 4,636,414 | 1/1987 | Tajima et al. | 428/489 |
| 4,651,494 | 3/1987 | Van Wagoner | 428/489 |
| 4,766,024 | 8/1988 | Nath et al. | 428/489 |
| 4,775,567 | 10/1988 | Harkness | 428/489 |
| 4,780,362 | 10/1988 | Ruehl et al. | 428/489 |

FOREIGN PATENT DOCUMENTS 1558176 12/1979 United Kingdom ............ 428/318.4

Primary Examiner—William J. Van Balen
Attorney, Agent, or Firm—Guido Modiano; Albert Josif

[57] ABSTRACT

Composite panel for obtaining waterproof roofings comprising two superimposed layers firmly held or bond together: one layer is made of a heat-insulating material having a thickness ranging from 10 mm to 60 mm and the other is made of a waterproofing material from 1 mm to 10 mm. The method of laying composite panels includes arranging panels on a supporting structure, fixing the panels to the supporting structure by means of mechanical anchoring means, sealing the seams between the panels and laying of a waterproofing membrane or mantle on the panels.

2 Claims, 1 Drawing Sheet

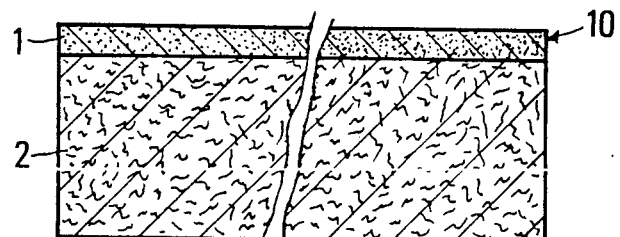
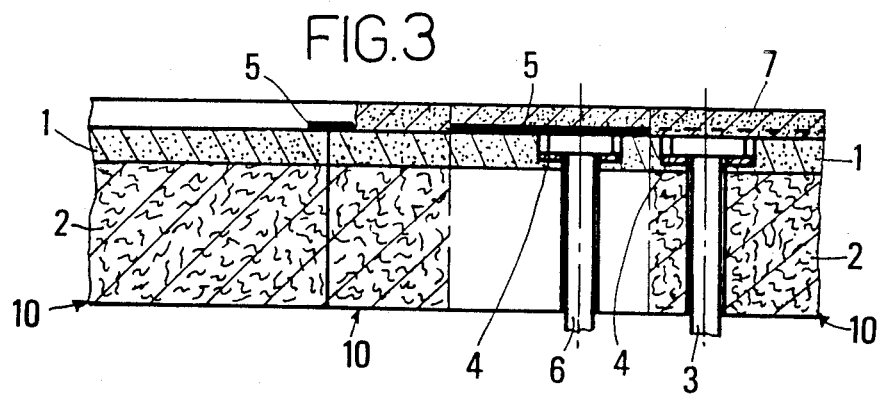
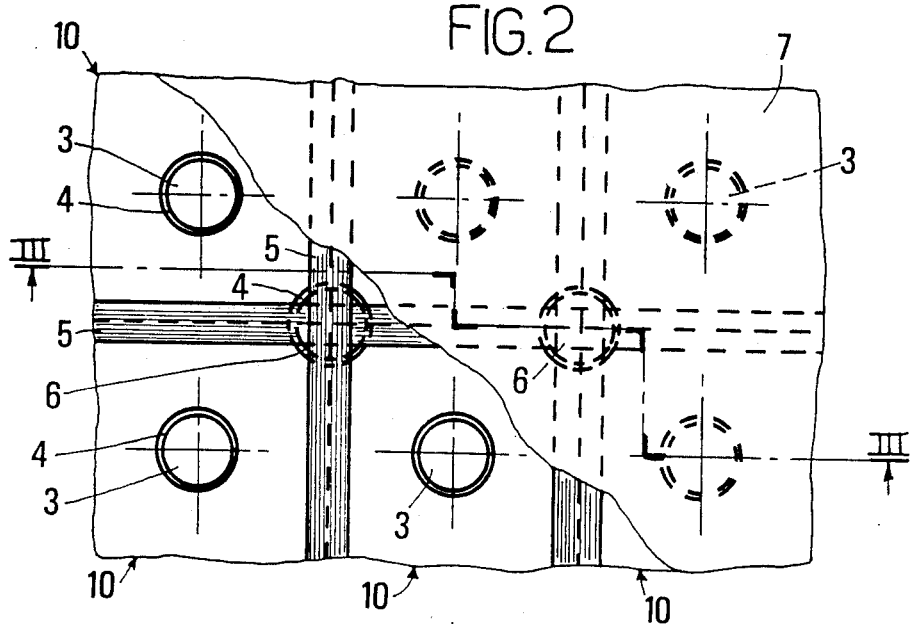

COMPOSITE PANEL AND METHOD OF MANUFACTURING WATERPROOF ROOFINGS

BACKGROUND OF THE INVENTION

The present invention regards a new composite panel and a method of manufacturing waterproof roofings for buildings.

The remaking of an old waterproof roof can be effected either by applying to the existing roofing a non-waterproofing mantle after all proper repairs have been carried out, or by directly applying a new mantle onto the structure of the roof after having entirely eliminated the old covering. Especially when adopting the first solution it is always very difficult to obtain a well levelled new surface, which is thus suitable for receiving a new waterproofing mantle since the old mantle is often badly damaged in that it has cracks and undulations.

To obviate this drawback, resort has been made to a method that comprises the following operations.

1. Dry-laying on the old mantle or cover, panels made of a rather rigid material, having a thickness of about 2.5 cm, i.e. panels on which one can walk, and having the function of supporting a new waterproofing membrane and increasing the insulating capacity of the roofing.

2. Securing the panels to the roof structure through mechanical fastening by means of flush-head nails of suitable type and in appropriate number.

3. Dry-laying of a bituminized feltpaper (e.g. of the 500 g/m type) on the panels, which has the function of protecting the panels against the action of the flame that is used for applying a further layer of waterproofing material. This is done when the panel consists of inflammable material.

4. Application and fixing of feltpaper to the panels.

5. Laying a first waterproofing layer or membrane by causing it to fully adhere to the panels covered by the feltpaper by means of a propane torch.

6. Laying of a top waterproofing layer which completely adheres to the first layer.

Thus, at least six operations are necessary for remaking the waterproofing of a roof or for the application of a new roofing, which involves excessive labour expenses and time.

It should also be stated that panels conventionally used for this purpose are rather brittle, poorly adherent and have a low degree of flexion per unit load.

To reduce the risk of breakings, use is made of panels having reduced dimensions. This requires, however, a large number of fixing nails and points or seams in the roofing.

Moreover, the weaker the structure of the panels, the poorer the grip of the nails. Thus, it is necessary to increase the quantity of nails to ensure proper fixing, but this is uneconomic besides being inconvenient from the structural point of view.

SUMMARY OF THE INVENTION

The main object of the present invention is to provide a new composite panel structure that, besides having a heat-insulating effect, constitutes a stout structural modular component for obtaining strong, stable and long-lasting plane surfaces, for having laid thereon laying and supporting waterproof mantles.

Another object of the present invention is to provide a new panel suitable for acting as a valid support for easily and quickly laying waterproof mantle, thereby obtaining a roofing having a good heat resistance.

An not least object of the present invention is to provide a panel having good features of mechanical strength, so that it can be used with relatively large dimensions and thus laid with a reduced number of mechanical fasteners.

Another object of the present invention is to provide a method of obtaining a support surface for a waterproof mantle or roofing, which comprises a plurality of panels and is waterproof already upon laying the panels, i.e. before receiving on it a final waterproof mantle, thereby simplifying the laying work as the roofer has no longer the task of waterproofing for the panels immediately after the same have been laid to prevent them from absorbing humidity.

According to a first aspect of the present invention there is provided a composite panel for obtaining waterproof roofings comprising a layer of heat-insulating material and a layer of waterproof material secured to a face of the heat-insulating material.

The waterproof layer has a double advantage of giving the panel both higher cohesion while simultaneously flexural strength and forming a first layer of the whole waterproof roofing.

According to another aspect of the present invention there is provided a method of laying and obtaining a waterproof roofing, which comprises:

dry-laying of two-layer panels on a support structure, fastening the panels to the support structure through mechanical fastening means, sealing the seams between the panels, and laying a waterproof roofing mantle or membrane on the panels.

BRIEF DESCRIPTION OF THE DRAWINGS

The invention is further described hereinafter with reference to the Examples and the accompanying drawings, in which:

FIG. 1 shows a cross-sectional view of a panel according to the invention;

FIG. 2 diagrammatically shows a roofing obtained by making use of the panels of FIG. 1 fastened to a support frame or plane; and FIG. 3 diagrammatically shows a cross-section view taken along the line III—III of the waterproof roofing of FIG. 2.

DESCRIPTION OF THE PREFERRED EMBODIMENTS

With reference to the drawings a composite panel 10 according to the present invention comprises a layer 1 of a waterproof bitumen compound secured to a layer 2 of heat-insulating material.

The thickness of the layers 1 and 2 is not critical and can vary within a wide range depending upon specific requirements of use. The layer 1 of waterproof bitumen compound can have a thickness in the range of 1 to 6 mm, whereas the layer of heat-insulating material can range from 10 to 60 mm, thicknesses of the order of 20 to 40 mm being advantageous in general.

In order to make it possible to lay panels also on inclines and to ensure fixing to a support or laying structure, the panels are mechanically fastened or secured to such a support structure through any suitable fastening means, e.g. nails 3.

While being laid the panels 10 are set close to one another and fastened or secured at their center by means of a flush-head nail 3, as shown in FIGS. 2 and 3. To preserve waterproofing of the laying plane thus obtained, the nails 3 are applied by placing, between the surface of the panel and the flat head of each nail, a foil section or disc 4 of a self-adhesive bitumen compound having a diameter large enough to extend throughout the head of the nail. This is advantageous also because the used self-adhesive compound has the property of self-sealing when punctured.

After this operation the gaps or seams between the various panels are sealed by means of a tape 5 having a suitable width, e.g. made of the same self-adhesive compound as that used under the head of the nails. In order to use a minimum number of nails, a preferred system is to fasten each panel besides by means of one nail 3 in its central zone also by other nails 6 (e.g. having a flush head and with interposition of a respective disc of self-adhesive bitumen compound) at each corner where the seams of the various adjacent panels cross. In this way, two nails on average for each panel are used, as shown in FIG. 2.

When mounting is completed, the laying plane surface formed by the panels 10 thus assembled is fully waterproofing.

This is a considerable advantage of the present invention as with the conventional method referred to above it is always necessary to lay the first waterproofing layer immediately after laying the panels to present the panels from absorbing for any reason humidity that would remain included and trapped within the panels and would cause subsequent decay of the waterproofing.

The laying plane surface thus obtained is finally covered with a waterproofing membrane 7 that forms the final mantle or layer of the roofing.

It will be noted that with the solution in accordance with the present invention it is possible to use only two mechanical fasteners per panel. This is particularly advantageous as for this kind of use rather cheap panels are often employed, i.e. panels having their heat-insulating layer made of material having poor cohesion and low flexing resistance. The application of the layer 1 of waterproofing material to the panels results in an increase of both their cohesion and flexing resistance. Thus, it is possible to use a smaller number of mechanical fasteners per panel as the risk of failure of the same both during laying and in use is eliminated or drastically reduced. For this reason it is also possible to use panels having larger perimetrical dimensions as the risks of failure during both handling and transport of the same are smaller.

The discs 4 under the head of the nails and the tapes 5 used for sealing the seams of the panels are constituted by a self-adhesive and waterproofing bitumen product essentially obtained from a bitumen-rubber mixture in the ratio 65:35 and 95:5 (a particularly advantageous ratio has been found to be 90:10) as described and disclosed in the published Italian patent application No. 20906 A/81 of the same assignee of the present application. While being produced, the mixture is calendered to a desired thickness and then applied or joined to a polyethylene (P.E.) film having a thickness ranging from 50 to 300 microns. It has been found that P.E. films having a thickness of 100 microns are especially advantageous. On its lower face the membrane can be coated with a removable self-adhesive protection film, e.g. a sheet of silicone-coated paper or a silicone-coated polyethylene film.

The layers 2 acting as a support for the heat-insulating layer 1 and the waterproofing mantle 7 can be made of various types of material which can comprise both those usually used as heat-insulating materials and those specifically prepared for this kind of application.

Advantageously, such materials must have a good handling resistance, compression resistance, heat resistance and dimensional stability. By way of example, among organic materials one can quote panels of expanded and impregnated cork, polyurethane and polyisocyanide foam, extruded polystyrene, foamed polystyrene, cross-linked polyethylene and foamed PVC.

Among inorganic materials one can quote, by way of example, cellular glass and glass fiber in panels. Materials mostly used for this type of application are: panels including agglomerated wood fibers, panels of cellulose fibers (cardboard), panels of foamed pearlite or rock wool. After having suitably bound the fibers to one another by means of organic binders, panels are produced in the desired dimensions and thickness by pressing the fiber mass at suitable pressures and temperatures.

The bitumen compound layer 1 on the upper part of the panels is constituted by bitumen or bitumen modified with plastomers and/or elastomers. Examples of plastomers suitable for modifying bitumen are: polypropylene, polyethylene, whereas examples of elastomers are: natural rubbers, styrene-butadiene, ethylene-propylene, polychloroprene and the like. Subsequently, a filler, e.g. mica, talc, silicates, carbonates, kaolins and the like, can be added to the bitumen compound mainly to reduce its cost and to prevent it from aging due to heat. Moreover, the bitumen compound can include a filler to render it flame-resistant. In other terms, if such a filler is included, ignition of the bitumen compound and the surface flame propagation are considerably retarded. This also results in greater safety in the subsequent heat application of roofing material and in a positive contribution to the over-all safety of the roofing. The feature of retarding the flame propagation can be attained by including in the bitumen compound suitable additives well known in the industrial practice. Among such additives especially suitable are trihydrated alumina (THA), sodium borates, zinc borates and other metal borates, or combinations of antimony oxide ($Sb_2O_3$) and halogenated products, e.g. chloroparaffin, in a ratio ranging from 1:2 to 2:1. The amount of additives or fillers can range from 25% to 65% with respect to the bitumen compound. Satisfactory results are obtained with percentages of 40% to 50%.

Another type of flame-propagation retarding inclusion is based on the use of a material that expands at a predetermined temperature (>200° C.), thereby providing on insulating layer which reduces heat transmission and increases fire resistance. An inclusion of this type is disclosed in the U.S. Pat. No. 4,372,997 granted to Minnesota Mining and Manufacturing Co. on Feb. 8, 1983.

A composite panel according to the present invention, i.e. a panel coated with a bitumen compound can be produced by a machine arranged to continuously applying a desired thickness of bitumen compound maintained in a liquid state at a temperature ranging from 150° C. to 190° C. A panel 10 in accordance with the present invention is thus obtained which can be cut out to desired dimensions and installed according to the specifications described above.

To make storing and transport easier, the bitumen compound covering the panel is coated with a protection layer that can include talc or fine sand or a film of plastics material, e.g. polyethylene and polypropylene or a sheat of material, such as silicon paper or polyethylene, which is removed upon laying the waterproofing mantle 7.

The invention is further illustrated in the following examples.

EXAMPLE 1

By means of a suitable coating machine a panel 10 having a layer 2 formed by foamed volcanic rock (pearlite), glass fiber and cellulose bound to bitumen (Fesco Board manufactured by Manville De France S.A.) having a thickness of 20 mm and dimensions 60×120 cm, was coated with a layer 1 of waterproofing bitumen compound having a thickness of 2 mm and applied to it at a temperature of 180° C. The bitumen compound, which was an atactic polypropylene-modified bitumen, had a softening temperature of 150° C. measured according to ASTM D-36 method, a penetration of 25 dmm at 25° C. measured according to ASTM D-5, and a viscosity of 3500 CP at 180° C. when measured by a Brookfield Thermosel viscosimeter.

A sample (20×110×200 mm) of the panel 10 thus obtained after a 24-hours conditioning period at a temperature of 25° C. was tested to determine its flexion load. The same test was carried out on a panel of the same type not coated with bitumen compound. The following test results were obtained:

|  | Ultimate tensile stress F(N) |
| --- | --- |
| Fesco Board coated with a bitumen layer | |
| applied to the face thereof under load | 70.12 |
| applied to its other face | >170 |
| uncoated board | 68.35 |

The above ultimate tensile stress values are each the average of four test results.

EXAMPLE 2

The same procedure as that set forth in Example 1 was followed, except that the bitumen compound forming the layer 1 had a softening temperature (ASTM D-36) ranging from 115° C. to 160° C.; penetration at 25° (ASTM D-5) of 15 to 50 dmm. The viscosity of the bitumen compound when measured at 180° C. by means of a Brookfield Thermosel viscosimeter was from 1500 to 10,000 CP, preferably from 3000 to 6000 CP. The panel 10 had a layer 2 made of foamed polyurethane having a thickness of 20 mm and dimensions of 110×200 mm. The results of flexion load tests were the following:

|  | Ultimate tensile stress F(N) |
| --- | --- |
| Foamed polyurethane coated with a bitumen layer | |
| applied to the face thereof under load | 110.55 |
| applied to its other face | >170 |
| uncoated board | 85.87 |

The above ultimate tensile stress values are each the average of four test results.

In the above Examples 1 and 2, the value 170N means that the panel does not break under flexion load.

EXAMPLE 3

Another sample of panel 10 coated with the bitumen compound 1 having dimensions of 200×200 mm was secured by means of a flush-head nail 3, whose head had a diameter of 50 mm, to a support constituted by two plates of asbestos cement having an over-all thickness of 16 mm and the same dimensions as those of the panel sample. A disc A of self-adhesive bitumen material having a diameter of 60 mm was placed between the head of the nail and the surface of the panel coated with bitumen compound 1. Nordshield adhesive, a product of Nord Bitumi s.a.s. of Sona-Verona-Italy, which is an elastomer-modified bitumen membrane coated with a 100 micron polyethylene film and having an over-all thickness of 1.1 mm, was used as a self-adhesive material. The main features of the used Nordshield material are as follows:

| bending at −25° C. | ASTM D-146 | no breakage |
| --- | --- | --- |
| ultimate tensile stress | UNI 8202-8 | 70 N/5 cm |
| water absorption | UNI 8202-22 | +0.2 |
| waterproofing | UNI 8202-21 | waterproof |

The sample obtained by nailing the panel to the asbestos cement support according to the above described modalities was tested to measure its waterproofing in accordance with the method described under paragraph 7.2.7.1 of the Canadian Standard 37-GP-56M "Standard for Membrane Modified Bituminous, Prefabricated and Reinforced for Roofing" issued by CGSB (Canadian General Standards Boards).

In this test, a glass cylinder having a diameter large enough to enclose the head of the nail and containing water up to a level 500 mm high was arranged in contact with the sample at its nailing area for a time period of 16 hours. No trace of humidity was found at the lower side of the sample at the end of the test period.

The waterproofing membrane 7 is advantageously self-adhesive and can comprise a weave or reinforcement and a bitumen-rubber mixture.

By way of example the weave can comprise glass fiber mat (e.g. a glass fiber mat marketed under the trade name Velimat manufactured by Balzaretti & Modigliani S.p.A. of Milan-Italy, TR 50 manufactured by Vitrofil S.P.A. of Milan-Italy) glass fabric, polyester fabric, unwoven polyester fabric (e.g. Trevira manufactured by Hoechst AG of Frankfurt Am Main-West Germany, Colback manufactured by Henca Colbond B.V. of Arnhen-Netherland, Terbondspan manufactured by Enichem S.P.A. of Milan-Italy), unwoven propylene fabric (e.g. Typar manufactured by Du Pont De Nemours of Geneva-Switzerland) a composite material polyester woven-non-woven fabric and glass fiber mat, polyester, or polyester fibers net, net and glass fiber mat composite and the like having the feature of being easily impregnated and coated by the bitumen-rubber mixture.

The bitumen-rubber mixture can be in a ratio ranging from 65:35 to 95:5, especially advantageous and preferred being the mixtures in a ratio ranging from 75:25 to 90:10.

The bitumen can comprise distilled and/or blown oil bitumen, tar pitch, natural bitumen, suitably modified and including filler or fillers. The used bitumen material has preferably a penetration ranging from 40 to 400 dmm at 25° C. when measured in accordance with ASTM D-5. It was found that bitumen mixtures having penetration values ranging from 70 and 250 dmm at 25° C. are especially advantageous.

The rubber used for obtaining the bitumen-rubber mixture can be chosen among any available type of rubber, provided it is compatible with the bitumen, e.g. styrene-butadiene-styrene rubber, styrene-butadiene-acrylonitrile, ethylene-vinylacetate, polyisoprene, polybutadiene, polychloroprene, butyl rubber and the like.

In general, the waterproofing membrane 7 has a softening temperature ranging from 60° C. to 130° C. (when measured according to the method ASTM D-5) and a penetration of 60 to 300 dmm at 25° C. (when measured according to the method ASTM D-5).

The bitumen-rubber mixture can also include fillers, e.g. calcium carbonate, talc, slate powder and the like or chemical compounds suitable for increasing its adhesive power, e.g. a modified aliphatic resin (such as Escorez 2101 manufactured by Exxon Chemical Co.- USA), or terpenic resins commercially known by the trade name Wingtak manufactured by Goodyear Chemicals Co. -USA (among the series Wingtak, the most useful filler is Wingtak 115 as it has a high melting point), or terpenic resins marketed by Hercules Co.- USA under the trade name Piccolite, among which the most suitable are the types A115 and A125.

An important feature of the waterproofing membrane 7 is that of being elastoplastic and of keeping this feature in time even at low temperatures. Thus, the membrane can adjust itself to any setting of the bearing frames without cracking or becoming detached.

Tests were made to measure the adhesion between the adhesive membrane 7 and the coated panel 10. A sample of adhesive membrane 7 (30 cm long and 1 m wide) was applied, after its protection coating made of a siliconate polyethylene film, to a coated panel 10 formed by Fesco Board 10 cm long and having a thickness of 25 mm.

Before applying the self-adhesive membrane 7 the protection coating, e.g. consisting of siliconated polyethylene, is also removed from the panel.

The sample thus obtained was conditioned for 24 hours at a temperature of 23°±2° C. and then subdivided into a plurality of samples 40 cm long and 5 cm wide. Five of such samples were subjected to a peeling test at 90° C. on a Istron dynamometer, type 4301, with a separation speed among its clamps of 100 mm/min.

The same test was carried out on further 10 samples after having been subjected to the following artificial aging treatment:

1. Heat aging at 70°±1° C. for 56 days (5 samples).
2. Accelerated aging for 400 hours (5 samples) by means of a Q.U.V. Tester manufactured by the Q-Panel Co. 15610 Ind. Pkwy-Cleveland-Ohio 44135, according to the method ASTM G 53/77.

The following continuous test procedure was followed:

4 hours of exposure to U.V. radiation (wave length from 320 to 280 mm) at 60° C.;

4 hours of exposure to condensation water at 40° C.

The results of the peeling tests were as follows (average values among 5 samples):

| 1. Samples as such | 30.55 N/5 cm |
| --- | --- |
| 2. Samples after heat aging | 35.48 N/5 cm |
| 3. Samples after artificial aging | 35.91 N/5 cm |

In any case, peeling off occured inside the Fesco Board panel, but no peeling was found between panel and self-adhesive panel.

I claim:

1. A composite panel for forming waterproof roofing, comprising a layer of heat insulating material and a layer of waterproofing material, said layer of heat insulating material having a face and one other face, said layer of waterproofing material being fixed to said one face of said layer of heat insulating material, wherein said layer of heat insulating material consists of foamed volcanic rock, glass fiber and cellulose and wherein said layer of waterproofing material consists of a filler and an atactic polypropylene-modified bitumen having a softening temperature of 150 degrees Celsius, a penetration of 25 dmm at 25 degrees celsius, and a viscosity of 3500 CP at 180 degrees Celsius, wherein said filler is a flame propogation retardant, said flame propogation retardant being selected from the group consisting of trihydrated alumina, sodium borate, zinc borate, and chloroparaffin and being present in said waterproofing material in an amount ranging from 40 to 50%, said panel further comprising a removable protection layer, said removable protection layer being constituted by a material selected from the group consisting of talc, fine sand, polyethylene, polypropylene and silicon paper, said layer of heat insulating material having a thickness ranging from 20 to 40 mm, said layer of waterproofing material having a thickness ranging from 1 to 10 mm, said panel having a flexing resistance of at least 170N when a load is applied to said other face of said layer of heat insulating material.

2. A composite panel for forming waterproof roofing, comprising a layer of heat insulating material and a layer of waterproofing material, said layer of heat insulating material having a face and one other face, said layer of waterproofing material being fixed to said one face of said layer of heat insulating material, wherein said layer of heat insulating material consists of foamed polyurethane, and wherein said layer of waterproofing material consists of a filler and an atactic polypropylene-modified bitumen having a softening temperature ranging from 115 to 160 degrees Celsius, a penetration ranging from 15 to 50 dmm at 25 degrees celsius, and a viscosity ranging from 3000 to 6000 CP at 180 degrees Celsius, wherein said filler is a flame propogation retardant, said flame propogation retardant being selected from the group consisting of trihydrated alumina, sodium borate, zinc borate, and chloroparaffin and being present in said water-proofing material in an amount ranging from 40 to 50%, said panel further comprising a removable protection layer, said removable protection layer being constituted by a material selected from the group consisting of talc, fine sand, polyethylene, polypropylene and silicon paper, said layer of heat insulating material having a thickness ranging from 20 to 40 mm, said layer of waterproofing material having a thickness ranging from 1 to 10 mm, said panel having a flexing resistance of at least 170N when a load is applied to said other face of said layer of heat insulating material.

* * * * *